(12) United States Patent
Aruga et al.

(10) Patent No.: US 9,193,300 B2
(45) Date of Patent: Nov. 24, 2015

(54) CEILING LIGHTING APPARATUS OF AIRCRAFT AND AIRCRAFT

(71) Applicant: MITSUBISHI AIRCRAFT CORPORATION, Aichi (JP)

(72) Inventors: Hiroyasu Aruga, Tokyo (JP); Takafumi Nakatani, Tokyo (JP); Masashi Fujimoto, Aichi (JP); Zenji Hayakawa, Aichi (JP); Motohiko Kawaguchi, Aichi (JP); Toru Ando, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/319,143

(22) Filed: Jun. 30, 2014

(65) Prior Publication Data

US 2015/0029736 A1    Jan. 29, 2015

(30) Foreign Application Priority Data

Jul. 25, 2013   (JP) ................................. 2013-154061

(51) Int. Cl.
*B60Q 3/02*    (2006.01)
(52) U.S. Cl.
CPC ..................................... *B60Q 3/025* (2013.01)

(58) Field of Classification Search
CPC ....... G09G 3/34; G09F 2013/222; F21S 8/02; F21V 7/0016
USPC .......................................................... 362/471
See application file for complete search history.

(56) References Cited

U.S. PATENT DOCUMENTS

| 7,455,263 B2 * | 11/2008 | Lau et al. ................... 244/118.5 |
| 7,494,255 B2 * | 2/2009 | Bryan et al. ................. 362/471 |
| 7,883,057 B2 * | 2/2011 | Lewis ......................... 244/129.1 |
| 7,959,326 B2 * | 6/2011 | Laporte .................... 362/249.02 |
| 2012/0061695 A1 * | 3/2012 | Kim .............................. 257/88 |

FOREIGN PATENT DOCUMENTS

JP    2011-140264 A    7/2011

* cited by examiner

*Primary Examiner* — Tracie Y Green
(74) *Attorney, Agent, or Firm* — Pearne & Gordon LLP

(57) ABSTRACT

To provide a ceiling lighting apparatus of an aircraft which can improve maintainability. The ceiling lighting apparatus includes: a ceiling panel 20 that is provided so as to be erected and laid with respect to a ceiling structure 14 that constitutes a ceiling structure of the aircraft with a hinge 15 as a rotation center; and a light 30 that is provided in the ceiling panel 20. A mechanic can perform maintenance of the light 30 in a comfortable posture with the ceiling panel 20 rotated to be suspended from a ceiling. Accordingly, the maintainability can be improved.

15 Claims, 6 Drawing Sheets

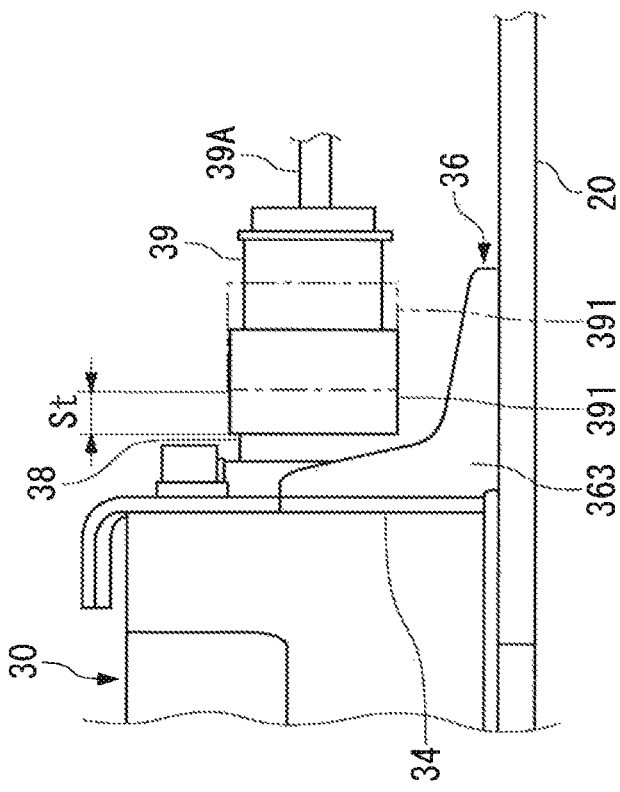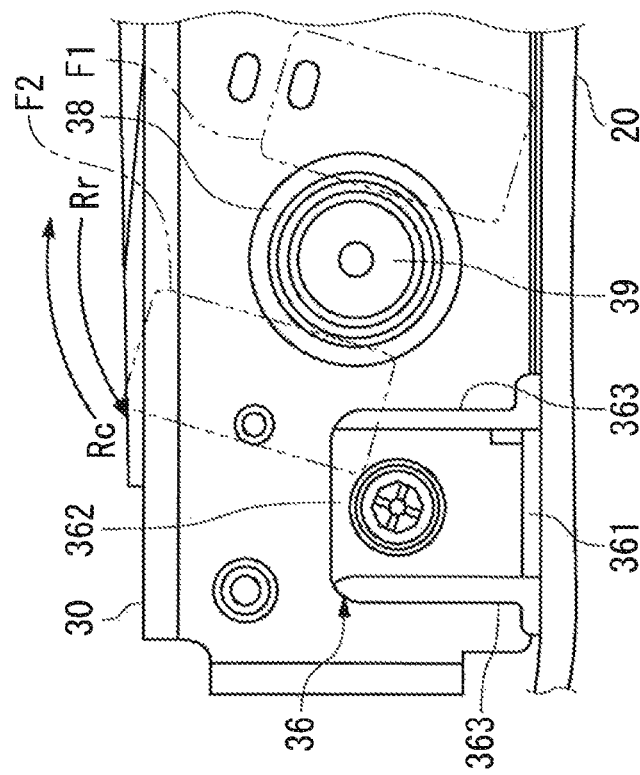

CEILING LIGHTING APPARATUS OF AIRCRAFT AND AIRCRAFT

BACKGROUND OF THE INVENTION

1. Field of the Invention

The present invention relates to a ceiling lighting apparatus which is provided at a ceiling of an aircraft to illuminate a cabin.

2. Description of the Related Art

A ceiling light which illuminates a cabin of an aircraft is provided at a ceiling of the cabin (Japanese Patent Laid-Open No. 2011-140264). The ceiling light is provided in a support member located at the ceiling of the cabin, or on a ceiling panel provided in the support member.

When the ceiling light is replaced, the light is removed from the ceiling panel in a case in which the light is provided on the ceiling panel. Alternatively, in a case in which the light is provided in the support member, the light is removed from the support member after removing the ceiling panel.

In any cases, the light replacement work is performed in a high place. Thus, the work is difficult to perform, and there is room for improvement in ease of maintenance work.

Also, when the ceiling panel is removed, a space for placing the large ceiling panel needs to be secured.

In view of the above points, an object of the present invention is to provide a ceiling lighting apparatus of an aircraft which can improve maintainability.

SUMMARY OF THE INVENTION

A ceiling lighting apparatus of an aircraft according to the present invention includes: a ceiling panel that is provided so as to be erected and laid with respect to a ceiling structure of the aircraft with a predetermined axis as a rotation center; and a light that is provided in the ceiling panel.

In the present invention, when maintenance of the light is performed, the ceiling panel is rotated into an erected state with respect to the ceiling structure. The ceiling panel is thereby suspended from the ceiling structure, and the light is exposed on a reverse side of the ceiling panel. Accordingly, a mechanic can work with the light in a comfortable position while standing on an aisle. Moreover, since the ceiling panel is suspended from a ceiling, there is no need to secure a space for placing the ceiling panel, and maintainability can be improved.

In the ceiling lighting apparatus of an aircraft according to the present invention, an electrical connector provided in the light is preferably located in the vicinity of the axis.

Since the axis is not changed in position even when the ceiling panel is rotated, as long as the connector is located in the vicinity of the axis, a wire connected to the connector is not pulled out when the ceiling panel is rotated.

In the ceiling lighting apparatus of an aircraft according to the present invention, preferably the ceiling panel is located above an aisle that extends longitudinally between a left-side seat and a right-side seat in a cabin, and the axis may be set along the longitudinal direction of the aisle.

Accordingly, the rotated ceiling panel is suspended in a posture along a traveling direction of the aisle. A mechanic can thereby perform a maintenance work while moving to and fro through the aisle with the ceiling panel erected.

In the ceiling lighting apparatus of an aircraft according to the present invention, it is preferable that the ceiling panel is located above an aisle that extends longitudinally between a left-side seat and a right-side seat in a cabin, and the light has a form along a direction crossing the longitudinal direction of the aisle, emit light from a rear side to a front side of the aisle, and a plurality of lights are arranged at an interval in the longitudinal direction of the aisle.

Appearance of the cabin can be improved by the light emitted forward from the plurality of lights. Also, passengers seated in the seats see reflected and diffused indirect light without directly seeing the light emitted from the lights, and thus travel in comfort.

An aircraft according to the present invention includes the above ceiling lighting apparatus.

In accordance with the present invention, the maintainability of the lighting apparatus provided on the ceiling of the aircraft can be improved.

BRIEF DESCRIPTION OF THE DRAWINGS

FIGS. 6A and 6B are views for explaining plugging and unplugging of an electrical connector of the light.

DETAILED DESCRIPTION OF THE PREFERRED EMBODIMENTS

In the following, an embodiment according to the present invention is described with reference to the accompanying drawings.

Figure 1:
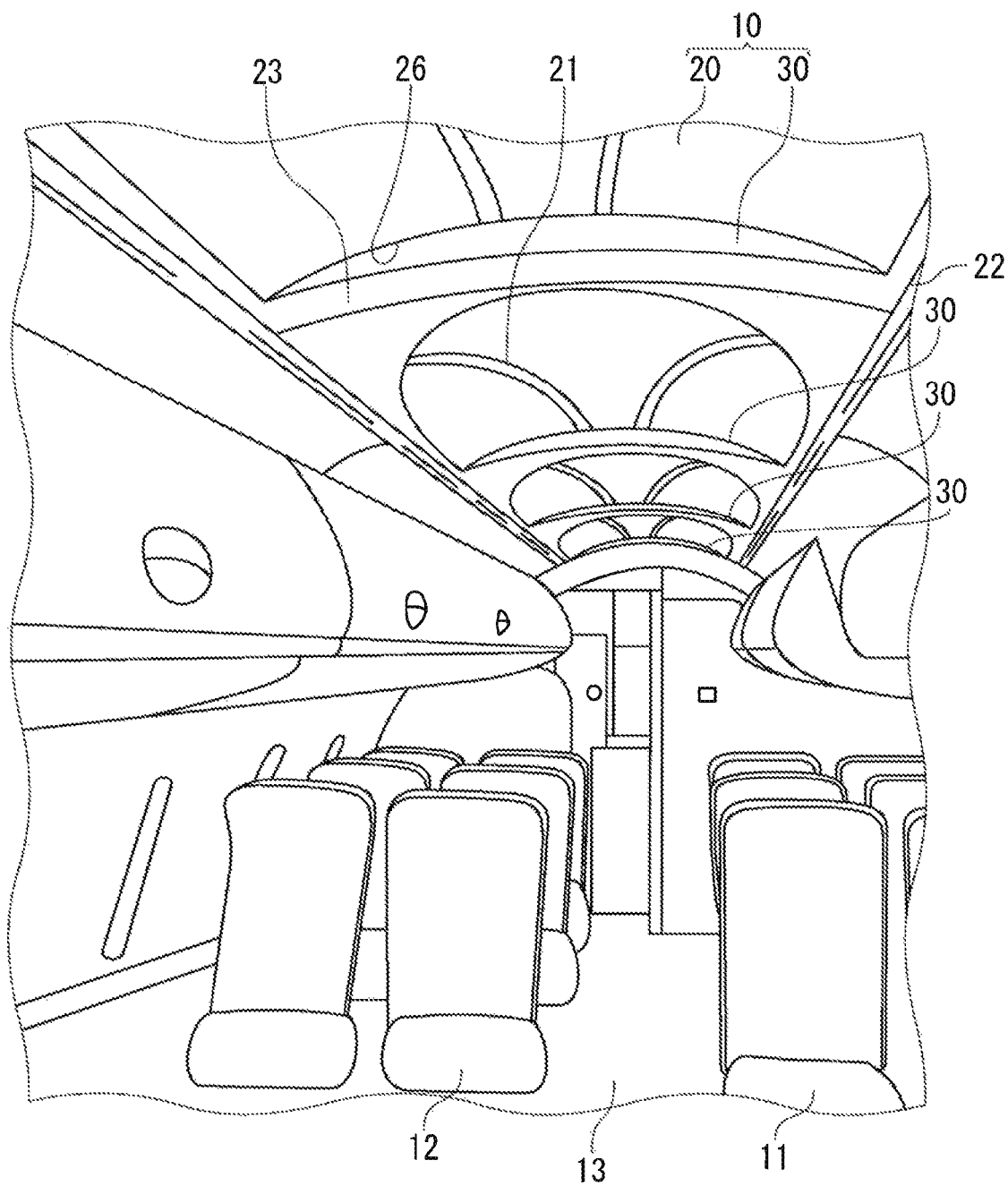
FIG. 1 is a view illustrating a ceiling lighting apparatus for illuminating a cabin of an aircraft according to an embodiment of the present invention.

A cabin of an aircraft shown in FIG. 1 is illuminated by a ceiling lighting apparatus 10 located at a ceiling.

The ceiling lighting apparatus 10 includes a ceiling panel 20 and a light 30 provided on the ceiling panel 20.

The ceiling panel 20 is located above an aisle 13 that extends longitudinally between left-side seats 11 and right-side seats 12 in the cabin.

The light 30 emits light from a rear side to a front side of the aisle 13 via an opening 26 of the ceiling panel 20.

Figure 2:
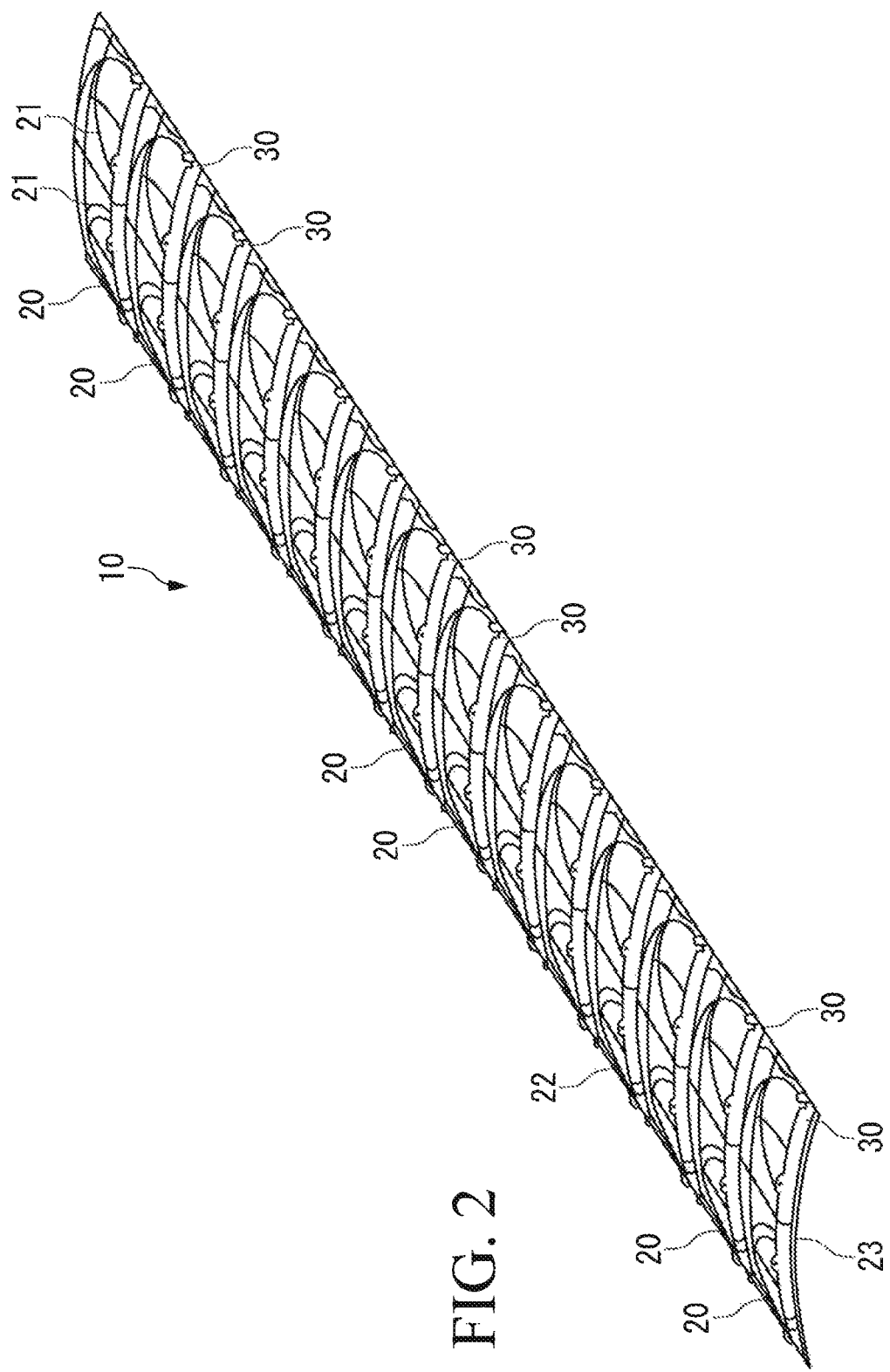
FIG. 2 is a perspective view illustrating a plurality of ceiling panels, and lights respectively integrated with the ceiling panels.

A plurality of ceiling panels 20 are arranged in the longitudinal direction of the aisle 13. Each of the ceiling panels 20 is provided with one light 30 as shown in FIG. 2.

Figure 3:
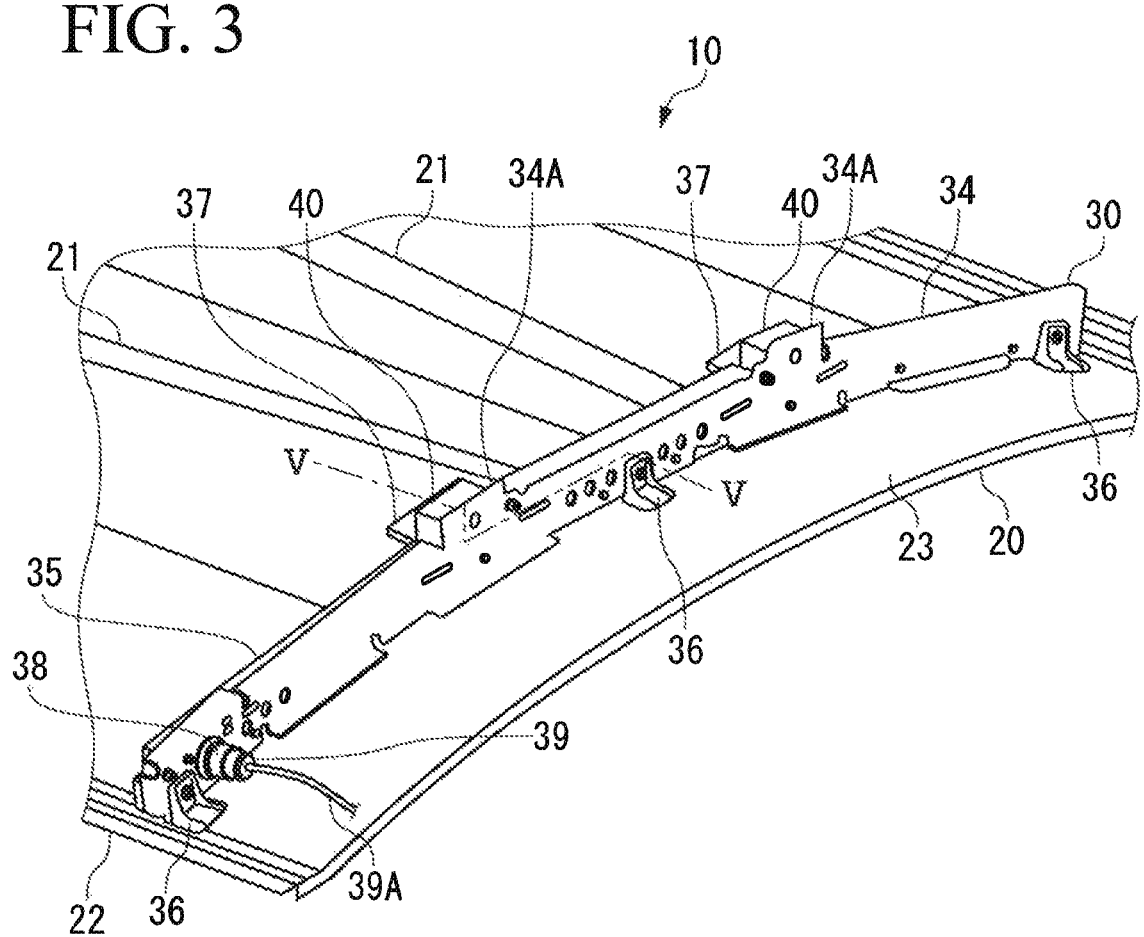
FIG. 3 is a perspective view illustrating a reverse side of the ceiling panel, and the light.

As shown in FIG. 3, a longitudinal section of each of the ceiling panels 20 is formed in a substantially arc shape convexed to a reverse surface side (an upper side) from a surface side (a lower side). A relief 21 is also formed in a convex curve to the reverse surface side from the surface side of the ceiling panel 20 so as to improve appearance.

Figure 4:
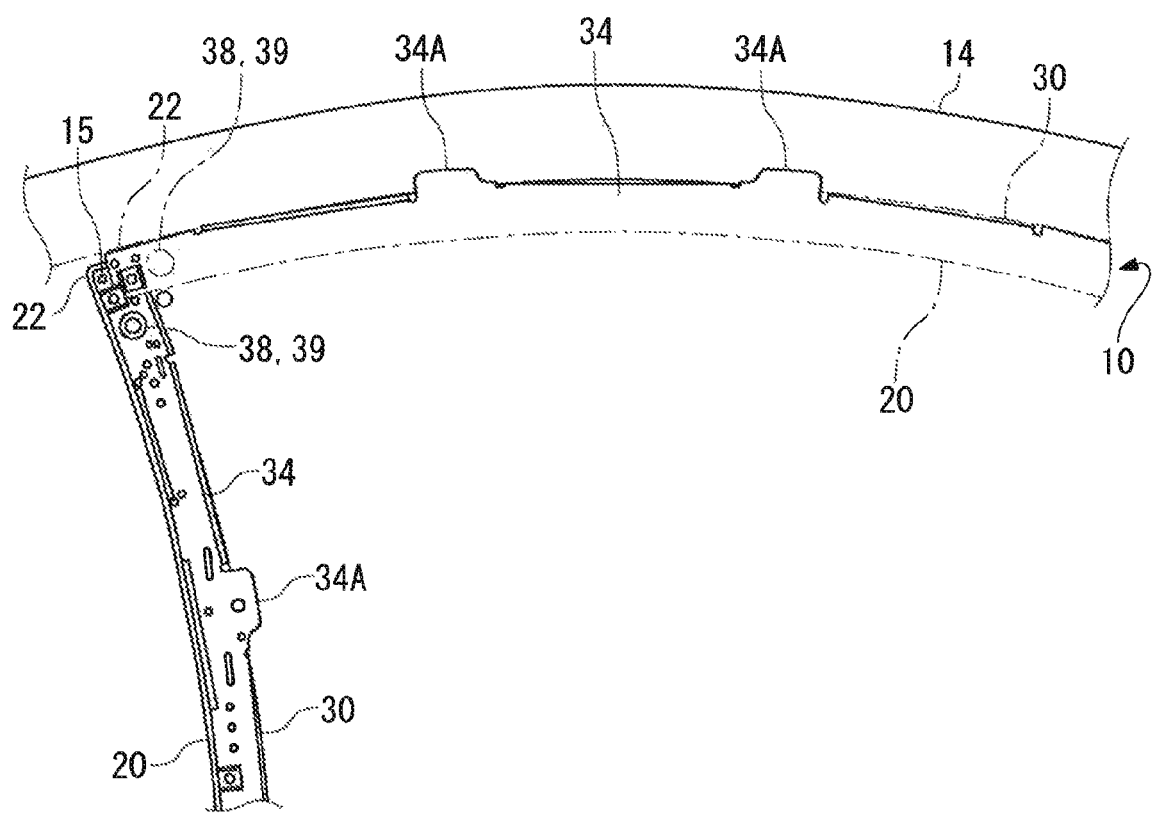
FIG. 4 is a view illustrating the ceiling panel and a support member that supports the ceiling panel.

As shown in FIG. 4, the ceiling panel 20 is supported by a support member 14 that constitutes a ceiling structure of the cabin.

The support member 14 defines a ceiling portion of a fuselage structure of the aircraft having a circle shape in cross section. Various pipes (not shown) are provided in the support member 14.

A left end portion 22 of the ceiling panel 20 is attached to the support member 14 with a hinge 15.

An axis along the longitudinal direction of the aisle 13 is set in the hinge 15. The ceiling panel 20 is provided so as to be able to be erected and laid with respect to the support member 14 between a laid state as indicated by an alternate long and short dash line and an erected state as indicated by a solid line with the axis of the hinge 15 as a rotation center as shown in FIG. 4. The ceiling panel 20 is rotated a predetermined rotation angle to a posture substantially perpendicular to a floor, and suspended from the support member 14 by the hinge 15.

Figure 5A:
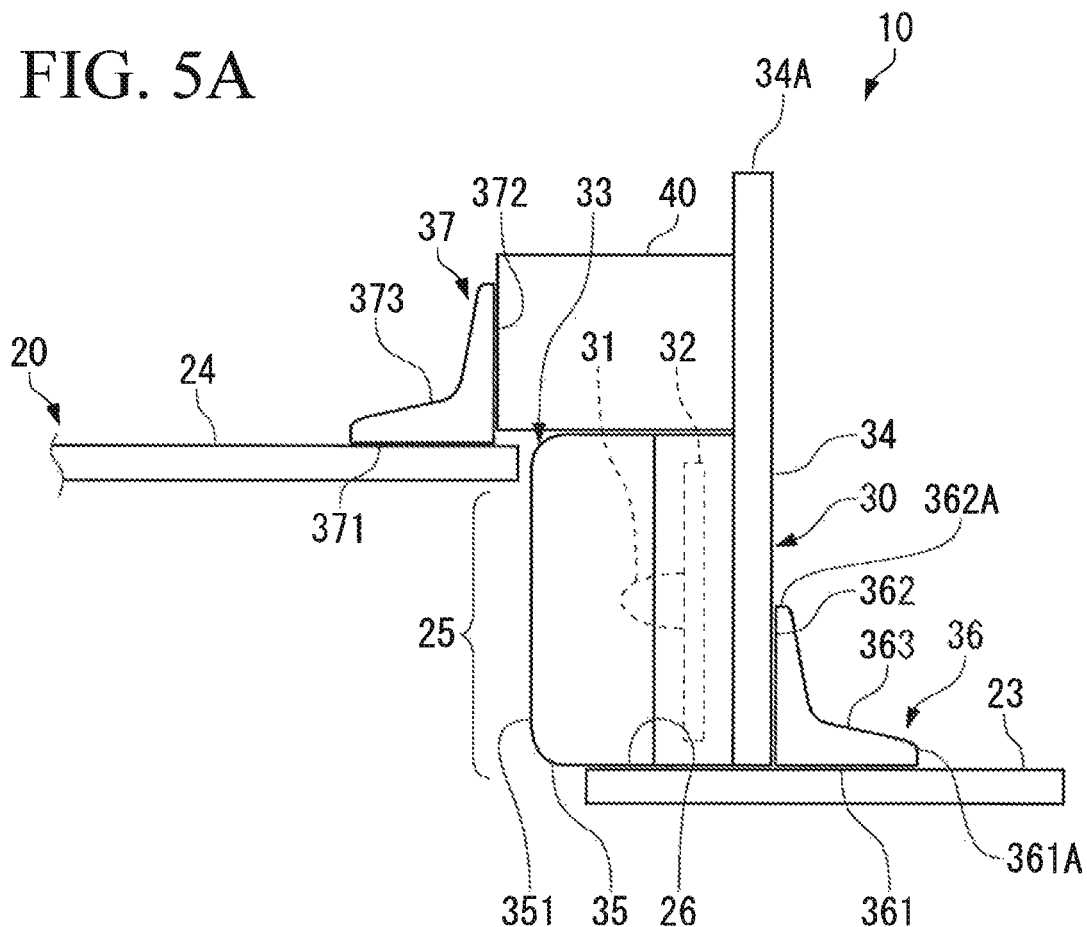
FIGS. 5A and 5B are sectional schematic views taken along a line V-V in FIG. 3.

A rear end portion 23 (FIG. 3) of the ceiling panel 20 is located at a lower position than a portion 24 provided ahead thereof to form a step portion 25 in the ceiling panel 20 as shown in FIG. 5A.

The opening 26 having a substantially arc shape convexed to the upper side from the lower side is formed in a rise portion of the step portion 25.

Next, a configuration of the light 30 is described.

As shown in FIG. 5A, the light 30 includes an LED (Light Emitting Diode) 31, a substrate 32 on which the LED 31 is mounted, and a housing 33 that accommodates the substrate 32.

The light 30 has a form along a width direction of the ceiling panel 20 perpendicular to the longitudinal direction of the aisle 13.

A plurality of LEDs 31 are arranged along a length direction of the light 30.

Other types of light sources may be also employed instead of the LED 31. Although a white LED is employed in the present embodiment, the light source may have any color. It may be configured such that the light color may be also changed.

A white paint is applied to a surface of the substrate 32 so as to effectively reflect light emitted from the LEDs 31.

The housing 33 includes a back plate 34 that supports the substrate 32, and a lens cover 35 that is attached to the back plate 34 so as to cover the LEDs 31.

The lens cover 35 has an emission surface 351 facing the back plate 34.

In the light 30, the light emitted from the LEDs 31 is homogenized over the entire emission surface 351 and emitted in a direction outward from the emission surface 351.

A receptacle pin 38 as an electrical connector is provided on a left end portion of the back plate 34 as shown in FIG. 3. A plug socket 39 that is connected to a wire 39A provided along the support member 14 is fitted to the receptacle pin 38. The receptacle pin 38 and the plug socket 39 are located in the vicinity of the hinge 15 (FIG. 4).

A spiral groove (not shown) is formed on an outer periphery of the receptacle pin 38. The plug socket 39 is plugged onto and unplugged from the receptacle pin 38 in the axial direction, while circumferentially rotating by being guided along the spiral groove.

Next, a structure to attach the light 30 to the step portion 25 of the ceiling panel 20 is described.

The light 30 is attached to the ceiling panel 20 by a rear bracket 36 and a front bracket 37 that are substantially L-shaped resin molded articles as shown in FIG. 5A.

The rear bracket 36 has a plate-like first piece 361 that is bonded to a reverse surface of the rear end portion 23 of the ceiling panel 20, and a plate-like second piece 362 that rises from the reverse surface of the rear end portion 23 and is screwed to the back plate 34 of the light 30. A pair of reinforcement walls 363 and 363 are formed on an inner side of the first piece 361 and the second piece 362. The reinforcement walls 363 and 363 are perpendicularly erected from the first piece 361 and the second piece 362 at an interval in the length direction of the light 30 as shown in FIGS. 6A and 6B.

The front bracket 37 has a plate-like first piece 371 that is bonded to the reverse surface of the ceiling panel 20 at a higher position than the rear end portion 23, and a plate-like second piece 372 that rises from the reverse surface of the ceiling panel 20 and is fixed to the back plate 34 via a spacer 40 as shown in FIG. 5A. A projection piece 34A (FIG. 3) for fixing the spacer 40 is formed on the back plate 34.

The second piece 372 and the spacer 40, and the spacer 40 and the back plate 34 are respectively fixed with screwed. A pair of reinforcement walls 373 and 373 similar to the reinforcement walls 363 and 363 of the rear bracket 36 are also formed in the front bracket 37.

The spacer 40 may have any form such as a rectangular parallelepiped shape and a cylindrical shape. The form of the spacer 40 is selected in view of dimensional accuracy, component costs, ease of attachment or the like.

Since the spacer 40 shown in FIG. 5A is formed in a block shape by cutting work, tolerances can be strictly suppressed. When the light 30 is attached to the ceiling panel 20, dimensions may be finely adjusted by adding a shim or performing cutting work. The spacer 40 is preferably made of resin to have a light weight.

Figure 5B:
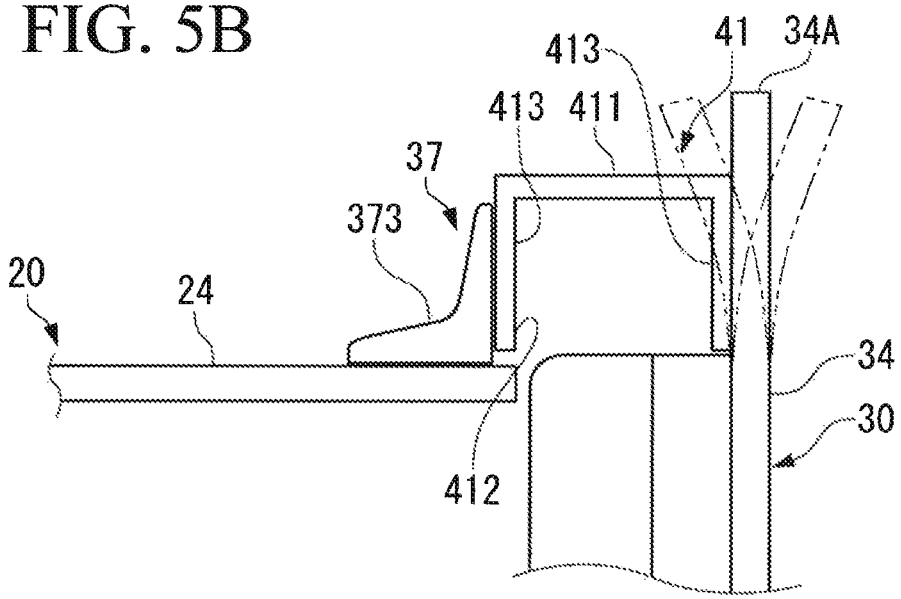

On the other hand, a spacer 41 shown in FIG. 5B is formed in a U shape by a metal plate. The spacer 41 is arranged with a web 411 directed upward and an opening 412 directed downward.

Since the spacer 41 can be elastically deformed so as to reduce a space between flanges 413 and 413, the spacer 41 can be easily inserted between the back plate 34 and the front bracket 37. The spacer 41 can be also formed at low cost by sheet metal working.

When the light 30 is attached to the ceiling panel 20, the light 30 is inserted between the rear bracket 36 and the front bracket 37 that are bonded to the ceiling panel 20 in advance. The rear bracket 36 is fixed to the back plate 34, and the front bracket 37 is also fixed to the back plate 34 via the spacer 40.

The light 30 is thereby integrated with the ceiling panel 20 with the emission surface 351 exposed on an outer side from the opening 26 of the ceiling panel 20.

An assembling tolerance can be absorbed by flexure of an upper end side of the back plate 34. The upper end side of the back plate 34 is flexed around the front bracket 37 to absorb a variation in dimensions as indicated by a long and two short dashes line in FIG. 5B. The entire light 30 fixed by the rear bracket 36 can be thereby prevented from being inclined. Therefore, the light 30 emits light in a predetermined direction, so that appearance or light emission performance of the light 30 is not affected.

As shown in FIG. 3, the rear bracket 36 is arranged at each of a left end, a right end, and a center portion of the back plate 34. The front bracket 37 is arranged at two positions each between three rear brackets 36.

The rear bracket 36 at the left end is located close to the receptacle pin 38 and the plug socket 39. Therefore, the height of the reinforcement walls 363 is reduced so as to facilitate fitting and removal of the plug socket 39 to and from the receptacle pin 38 (FIG. 5). Moreover, the reinforcement walls 363 has a gradually decreasing height toward a distal end 361A of the first piece 361 and a distal end 362A of the second piece 362 from a corner portion formed by the first piece 361 and the second piece 362. All corners of the reinforcement walls 363 are also chamfered.

As shown in FIG. 1, the lights 30 respectively provided in the plurality of ceiling panels 20 emit light from the rear side to the front side of the aisle 13 at an interval of one ceiling panel in the longitudinal direction of the aisle 13. The light emitted over the substantially entire width of the ceiling panel 20 from the respective lights 30 along the direction perpendicular to the longitudinal direction of the aisle 13 illuminates the cabin while projecting a repetition pattern onto the reliefs 21 of the ceiling panels 20.

The appearance of the cabin can be improved by the light emitted forward from the plurality of lights 30. Also, the light emitted from the respective lights 30 receives passengers into the cabin and thereby can effect brightness of the cabin.

Since the lights 30 emit light forward, passengers seated in the seats see reflected and diffused indirect light without directly seeing the light emitted from the lights 30. Thus, the passengers travel in comfort without being dazzled.

To perform maintenance and inspection of the light 30, a right end portion of the ceiling panel 20 is pulled downward so as to rotate the ceiling panel 20 with the hinge 15 as the rotation center as shown in FIG. 4.

Since the receptacle pin 38 and the plug socket 39 are located in the vicinity of the hinge 15 that is not changed in position even when the ceiling panel 20 is rotated, the wire 39A is not pulled out in association with the rotation of the ceiling panel 20.

When the ceiling panel 20 is rotated, the ceiling panel 20 is suspended from the ceiling structure, and the entire light 30 is thereby exposed on the reverse side of the ceiling panel 20. At this point, the ceiling panel 20 is preferably held at a predetermined rotation angle erected from the support member 14 by a mechanism provided in the support member 14 or the like.

The ceiling panel 20 is rotated with the axis along the longitudinal direction of the aisle 13 as the center, and suspended in a posture along a traveling direction of the aisle 13. Therefore, a mechanic can perform the maintenance and inspection while moving to and fro through the aisle 13 with the ceiling panel 20 erected. A mechanic can also perform the works without difficulty with the plurality of ceiling panels 20 erected at a time.

Replacement of the entire light 30 or the lens cover 35 is performed with the ceiling panel 20 erected.

At this point, a mechanic does not need to stretch his/her hand to the ceiling so as to perform the replacement or inspection work of the light 30, and can work with the light 30 in a comfortable posture while standing on the aisle 13.

Moreover, since the ceiling panel 20 is suspended from the ceiling, there is no need to secure a space for placing the ceiling panel 20 unlike with a ceiling panel that is completely separated from the ceiling structure.

Consequently, the ceiling lighting apparatus 10 of the present embodiment can improve maintainability.

The plug socket 39 is removed from the receptacle pin 38 of the light 30 when the entire light 30 is replaced. To this end, when a mechanic standing on a right side of the ceiling panel 20 performs the work with his/her right hand, the mechanic grips a grip portion 391 (FIG. 6B) of the plug socket 39 such that his/her thumb is located in a region F1, and his/her forefinger is located in a region F2 as shown in FIG. 6A. The mechanic retracts the plug socket 39 by rotating the plug socket 39 in a direction of an arrow Rr with respect to the receptacle pin 38. The forefinger (the region F2) comes closer to the rear bracket 36 by the rotation. However, the plug socket 39 moves away from the rear bracket 36 by a distance corresponding to an axial stroke St shown in FIG. 6B, so that the fingers do not interfere with the rear bracket 36.

When the plug socket 39 is fitted to the receptacle pin 38, the plug socket 39 is rotated in a direction of an arrow Rc. Thus, the forefinger (the region F2) moves away from the rear bracket 36, so that the fingers also do not interfere with the rear bracket 36.

Furthermore, since the height of the reinforcement walls 363 of the rear bracket 36 is suppressed as described above, the interference of the fingers with the rear bracket 36 is further prevented. Accordingly, the mechanic can comfortably perform the maintenance.

The constitutions described in the aforementioned embodiment may be also freely selected or changed into other constitutions without departing from the gist of the present invention.

Although the hinge 15 as the rotation center of the ceiling panel 20 is located on a left side of the ceiling panel 20 based on the traveling direction of the aircraft in the above embodiment, the rotating axis of the ceiling panel 20 may be of course set on a right side. The rotating axis of the ceiling panel 20 may be also set on a front side or a rear side.

Moreover, the ceiling panel 20 may be rotated about rotating axes set on, for example, both the right and left sides.

What is claimed is:

1. A ceiling lighting apparatus of an aircraft comprising:
   a ceiling panel that is rotatably mounted to a ceiling structure of the aircraft such that the ceiling panel is rotatable about a predetermined axis as a rotation center between an erected state and a laid state; and
   a light that is attached to the ceiling panel such that the light rotates with the ceiling panel.

2. The ceiling lighting apparatus of an aircraft according to claim 1, wherein an electrical connector provided in the light is located in the vicinity of the axis.

3. The ceiling lighting apparatus of an aircraft according to claim 1, wherein the ceiling panel is located above an aisle that extends longitudinally between a left-side seat and a right-side seat in a cabin, and
   the axis is set along the longitudinal direction of the aisle.

4. The ceiling lighting apparatus of an aircraft according to claim 1, wherein the ceiling panel is supported by a support member that constitutes the ceiling structure of the aircraft.

5. The ceiling lighting apparatus of an aircraft according to claim 4, wherein one end portion of the ceiling panel is attached to the support member with a hinge.

6. The ceiling lighting apparatus of an aircraft according to claim 5, wherein the ceiling panel is rotated with an axis of the hinge as a rotation center.

7. The ceiling lighting apparatus of an aircraft according to claim 1, wherein the ceiling panel is suspended from the ceiling structure when the ceiling panel is rotated.

8. The ceiling lighting apparatus of an aircraft according to claim 6, wherein the ceiling panel is suspended from the ceiling structure when the ceiling panel is rotated.

9. The ceiling lighting apparatus of an aircraft according to claim 1, wherein the ceiling panel is located above an aisle that extends longitudinally between a left-side seat and a right-side seat in a cabin, and
   the light has a form along a direction crossing the longitudinal direction of the aisle,
   emits light from a rear side to a front side of the aisle, and
   is a plurality of lights arranged at an interval in the longitudinal direction of the aisle.

10. The ceiling lighting apparatus of an aircraft according to claim 9, wherein the light has a form along a width direction of the ceiling panel, the width direction being substantially perpendicular to the longitudinal direction of the aisle.

11. The ceiling lighting apparatus of an aircraft according to claim 1, wherein the light comprises:
    an LED;
    a substrate on which the LED is mounted; and
    a housing that accommodates the substrate.

12. The ceiling lighting apparatus of an aircraft according to claim 11, wherein the housing comprises:
- a back plate that supports the substrate; and
- a lens cover that is attached to the back plate so as to cover the LED.

13. The ceiling lighting apparatus of an aircraft according to claim 12, wherein the lens cover has an emission surface facing the back plate, and
- the light is integrated with the ceiling panel with the emission surface exposed on an outer side from an opening of the ceiling panel.

14. The ceiling lighting apparatus of an aircraft according to claim 12, wherein an electrical connector is provided on one end portion of the back plate.

15. An aircraft comprising the ceiling lighting apparatus of an aircraft according to claim 1.

\* \* \* \* \*